(12) United States Patent
Vankamamidi et al.

(10) Patent No.: US 11,487,470 B2
(45) Date of Patent: Nov. 1, 2022

(54) SYSTEM AND METHOD FOR MANAGING STORAGE SPACE USAGE ON A STORAGE SYSTEM

(71) Applicant: EMC IP Holding Company, LLC, Hopkinton, MA (US)

(72) Inventors: Vamsi K. Vankamamidi, Hopkinton, MA (US); Liam Li, Beijing (CN); Yousheng Liu, Beijing (CN); Xinlei Xu, Beijing (CN)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 71 days.

(21) Appl. No.: 16/884,363

(22) Filed: May 27, 2020

(65) Prior Publication Data

US 2021/0373803 A1 Dec. 2, 2021

(51) Int. Cl.
*G06F 3/06* (2006.01)
*G06Q 10/06* (2012.01)

(52) U.S. Cl.
CPC .......... *G06F 3/0659* (2013.01); *G06F 3/0604* (2013.01); *G06F 3/0634* (2013.01); *G06F 3/0673* (2013.01); *G06Q 10/0631* (2013.01)

(58) Field of Classification Search
CPC .... G06F 3/0659; G06F 3/0604; G06F 3/0634; G06F 3/0673

USPC ......................................................... 711/154
See application file for complete search history.

(56) References Cited

U.S. PATENT DOCUMENTS

| | | | | |
|---|---|---|---|---|
| 8,751,463 | B1* | 6/2014 | Chamness | G06F 3/0608 |
| | | | | 707/693 |
| 2007/0011361 | A1* | 1/2007 | Okada | G06F 3/0619 |
| | | | | 710/8 |
| 2007/0168634 | A1* | 7/2007 | Morishita | G06F 3/0689 |
| | | | | 711/170 |
| 2009/0144518 | A1* | 6/2009 | Lewis | G06F 3/0605 |
| | | | | 711/171 |
| 2020/0341650 | A1* | 10/2020 | Jayaraman | G06F 3/0653 |

* cited by examiner

*Primary Examiner* — Christopher B Shin
(74) *Attorney, Agent, or Firm* — Brian J. Colandreo; Mark H. Whittenberger; Holland & Knight LLP

(57) ABSTRACT

A method, computer program product, and computing system for determining whether storage space usage on a storage system has reached a predefined threshold of a total storage capacity of the storage system. An out-of-space mode may be initiated on the storage system in response to determining that the storage space usage has reached the predefined threshold of the total storage capacity of the storage system. An amount of free storage capacity for exiting the out-of-space mode may be determined based upon, at least in part, a predefined minimum free storage capacity, a predefined maximum free storage capacity, and the total storage capacity of the storage system.

12 Claims, 5 Drawing Sheets

SYSTEM AND METHOD FOR MANAGING STORAGE SPACE USAGE ON A STORAGE SYSTEM

BACKGROUND

Storing and safeguarding electronic content may be beneficial in modern business and elsewhere. Accordingly, various methodologies may be employed to protect and distribute such electronic content.

For example, when a storage system is running out of storage space, the storage system may enter a read-only mode. For exiting the read-only mode, conventional approaches for storage space management may use a percentage of total storage space as a threshold. That is, if the free storage space is larger than a percentage of the total storage space, the storage system may exit the read-only mode. However, conventional storage space management approaches using a percentage of the total storage space to determine when to exit a read-only mode may cause significant periods where a storage system cannot process write IO requests (e.g., during a read-only mode) and the performance of the storage system may be degraded.

SUMMARY OF DISCLOSURE

In one example implementation, a computer-implemented method executed on a computing device may include, but is not limited to, determining whether storage space usage on a storage system has reached a predefined threshold of a total storage capacity of the storage system. An out-of-space mode may be initiated on the storage system in response to determining that the storage space usage has reached the predefined threshold of the total storage capacity of the storage system. An amount of free storage capacity for exiting the out-of-space mode may be determined based upon, at least in part, a predefined minimum free storage capacity, a predefined maximum free storage capacity, and the total storage capacity of the storage system.

One or more of the following example features may be included. Determining whether the storage space usage on the storage system has reached the predefined threshold of the total capacity of the storage system may include determining the storage space usage at one or more time intervals based upon, at least in part, a previously determined storage space usage. Initiating the out-of-space mode on the storage system may include processing one or more read requests on the storage system. Initiating the out-of-space mode on the storage system may include rejecting one or more write requests received for the storage system. Determining the amount of free storage capacity for exiting the out-of-space mode may include determining the amount of free storage capacity for exiting the out-of-space mode as a linear function of the predefined minimum free storage capacity, the predefined maximum free storage capacity, the total storage capacity of the storage system, a predefined minimum total storage capacity, and a predefined maximum total storage capacity. Determining the amount of free storage capacity for exiting the out-of-space mode may include determining the amount of free storage capacity for exiting the out-of-space mode as a logarithmic function of the total storage capacity of the storage system based upon, at least in part, the predefined minimum free storage capacity, the predefined maximum free storage capacity, a predefined minimum total storage capacity, and a predefined maximum total storage capacity. It may be determined whether the storage system has at least the amount of free storage capacity for exiting the out-of-space mode. The storage system may exit the out-of-space mode in response to determining that the storage system has at least the amount of free storage capacity for exiting the out-of-space mode.

In another example implementation, a computer program product resides on a computer readable medium that has a plurality of instructions stored on it. When executed by a processor, the instructions cause the processor to perform operations that may include, but are not limited to, determining whether storage space usage on a storage system has reached a predefined threshold of a total storage capacity of the storage system. An out-of-space mode may be initiated on the storage system in response to determining that the storage space usage has reached the predefined threshold of the total storage capacity of the storage system. An amount of free storage capacity for exiting the out-of-space mode may be determined based upon, at least in part, a predefined minimum free storage capacity, a predefined maximum free storage capacity, and the total storage capacity of the storage system.

One or more of the following example features may be included. Determining whether the storage space usage on the storage system has reached the predefined threshold of the total capacity of the storage system may include determining the storage space usage at one or more time intervals based upon, at least in part, a previously determined storage space usage. Initiating the out-of-space mode on the storage system may include processing one or more read requests on the storage system. Initiating the out-of-space mode on the storage system may include rejecting one or more write requests received for the storage system. Determining the amount of free storage capacity for exiting the out-of-space mode may include determining the amount of free storage capacity for exiting the out-of-space mode as a linear function of the predefined minimum free storage capacity, the predefined maximum free storage capacity, the total storage capacity of the storage system, a predefined minimum total storage capacity, and a predefined maximum total storage capacity. Determining the amount of free storage capacity for exiting the out-of-space mode may include determining the amount of free storage capacity for exiting the out-of-space mode as a logarithmic function of the total storage capacity of the storage system based upon, at least in part, the predefined minimum free storage capacity, the predefined maximum free storage capacity, a predefined minimum total storage capacity, and a predefined maximum total storage capacity. It may be determined whether the storage system has at least the amount of free storage capacity for exiting the out-of-space mode. The storage system may exit the out-of-space mode in response to determining that the storage system has at least the amount of free storage capacity for exiting the out-of-space mode.

In another example implementation, a computing system includes at least one processor and at least one memory architecture coupled with the at least one processor, wherein the at least one processor is configured to determine whether storage space usage on a storage system has reached a predefined threshold of a total storage capacity of the storage system. The at least one processor may be further configured to initiate an out-of-space mode on the storage system in response to determining that the storage space usage has reached the predefined threshold of the total storage capacity of the storage system. The at least one processor may be further configured to determine an amount of free storage capacity for exiting the out-of-space mode based upon, at least in part, a predefined minimum free storage capacity, a predefined maximum free storage capacity, and the total storage capacity of the storage system.

One or more of the following example features may be included. Determining whether the storage space usage on the storage system has reached the predefined threshold of the total capacity of the storage system may include determining the storage space usage at one or more time intervals based upon, at least in part, a previously determined storage space usage. Initiating the out-of-space mode on the storage system may include processing one or more read requests on the storage system. Initiating the out-of-space mode on the storage system may include rejecting one or more write requests received for the storage system. Determining the amount of free storage capacity for exiting the out-of-space mode may include determining the amount of free storage capacity for exiting the out-of-space mode as a linear function of the predefined minimum free storage capacity, the predefined maximum free storage capacity, the total storage capacity of the storage system, a predefined minimum total storage capacity, and a predefined maximum total storage capacity. Determining the amount of free storage capacity for exiting the out-of-space mode may include determining the amount of free storage capacity for exiting the out-of-space mode as a logarithmic function of the total storage capacity of the storage system based upon, at least in part, the predefined minimum free storage capacity, the predefined maximum free storage capacity, a predefined minimum total storage capacity, and a predefined maximum total storage capacity. It may be determined whether the storage system has at least the amount of free storage capacity for exiting the out-of-space mode. The storage system may exit the out-of-space mode in response to determining that the storage system has at least the amount of free storage capacity for exiting the out-of-space mode.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
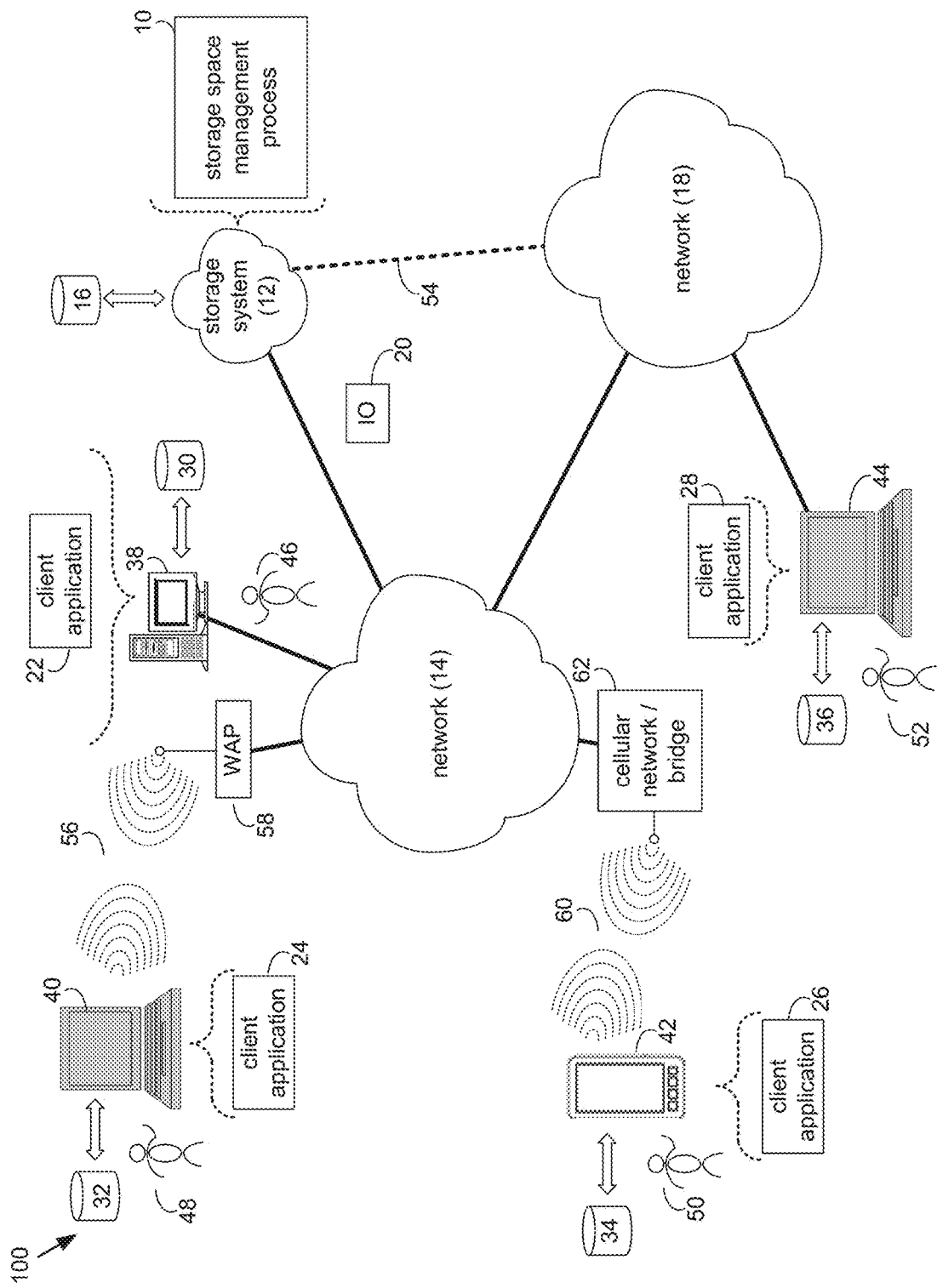
FIG. 1 is an example diagrammatic view of a storage system and a storage space management process coupled to a distributed computing network according to one or more example implementations of the disclosure.

System Overview:

Referring to FIG. 1, there is shown storage space management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage space management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage space management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage space management process, such as storage space management process 10 of FIG. 1, may include but is not limited to, determining whether storage space usage on a storage system has reached a predefined threshold of a total storage capacity of the storage system. An out-of-space mode may be initiated on the storage system in response to determining that the storage space usage has reached the predefined threshold of the total storage capacity of the storage system. An amount of free storage capacity for exiting the out-of-space mode may be determined based upon, at least in part, a predefined minimum free storage capacity, a predefined maximum free storage capacity, and the total storage capacity of the storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
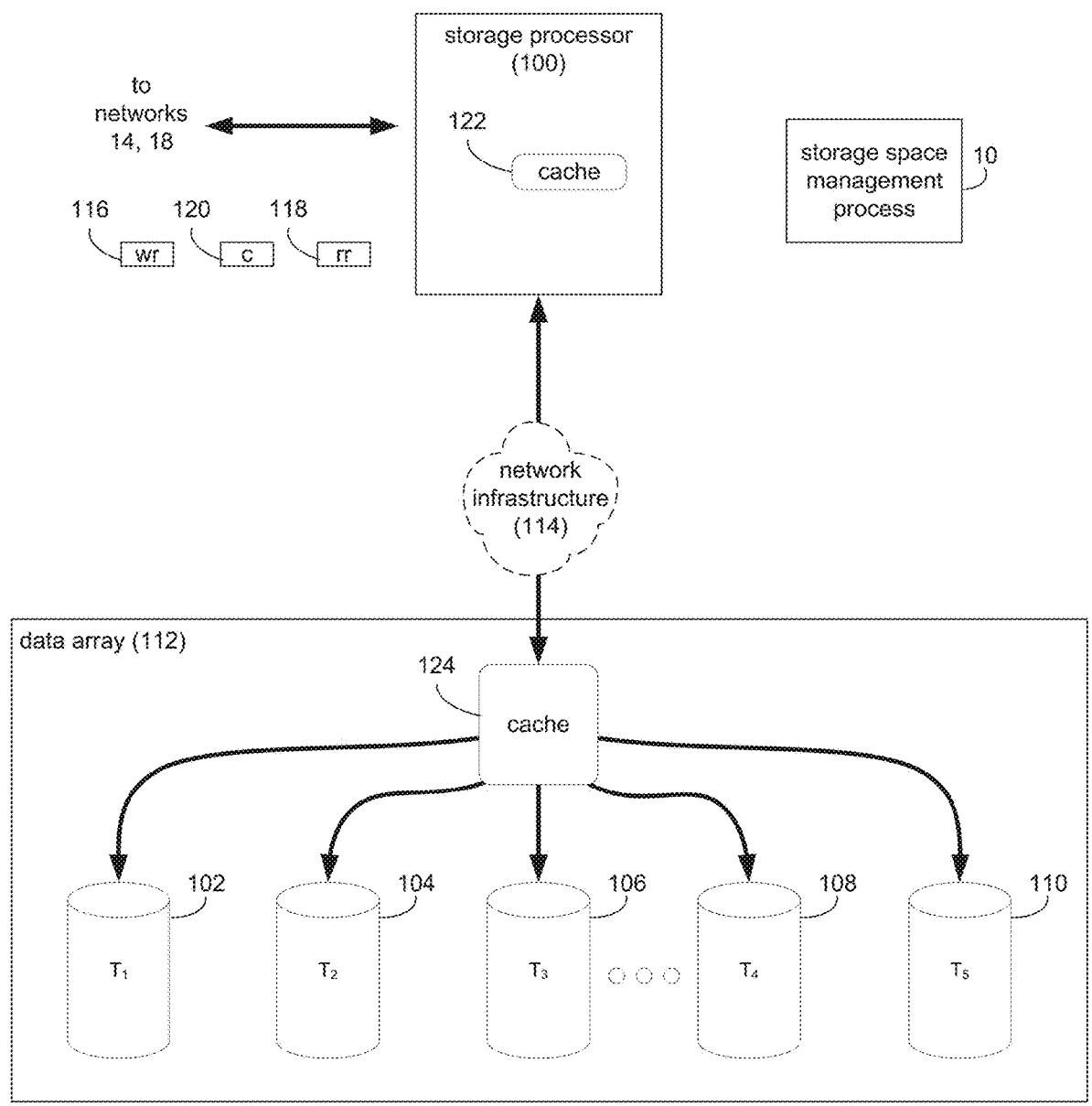
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage space management process 10. The instruction sets and subroutines of storage space management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage space management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of storage space management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage space management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
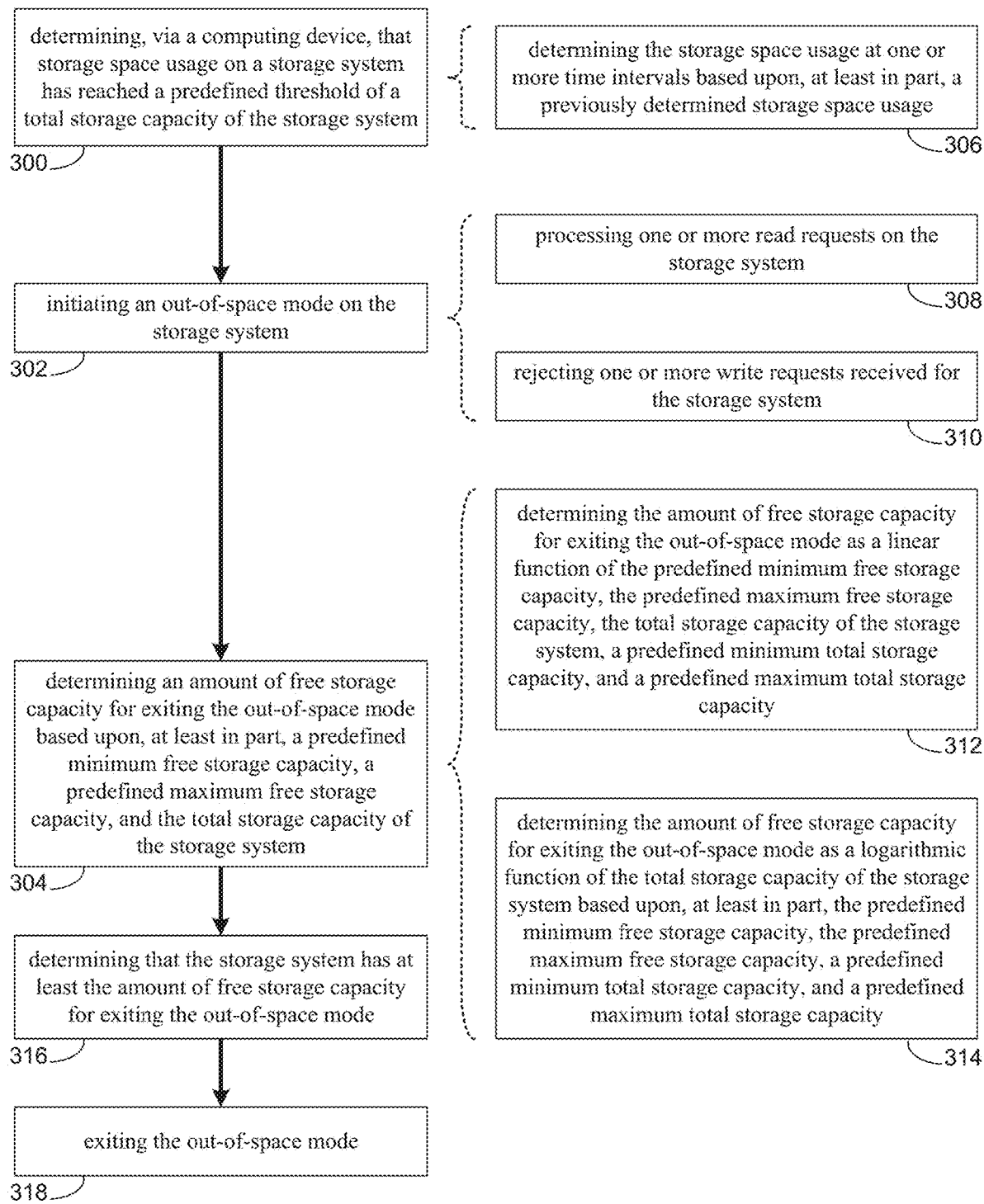
FIG. 3 is an example flowchart of storage space management process according to one or more example implementations of the disclosure.
Figure 4:
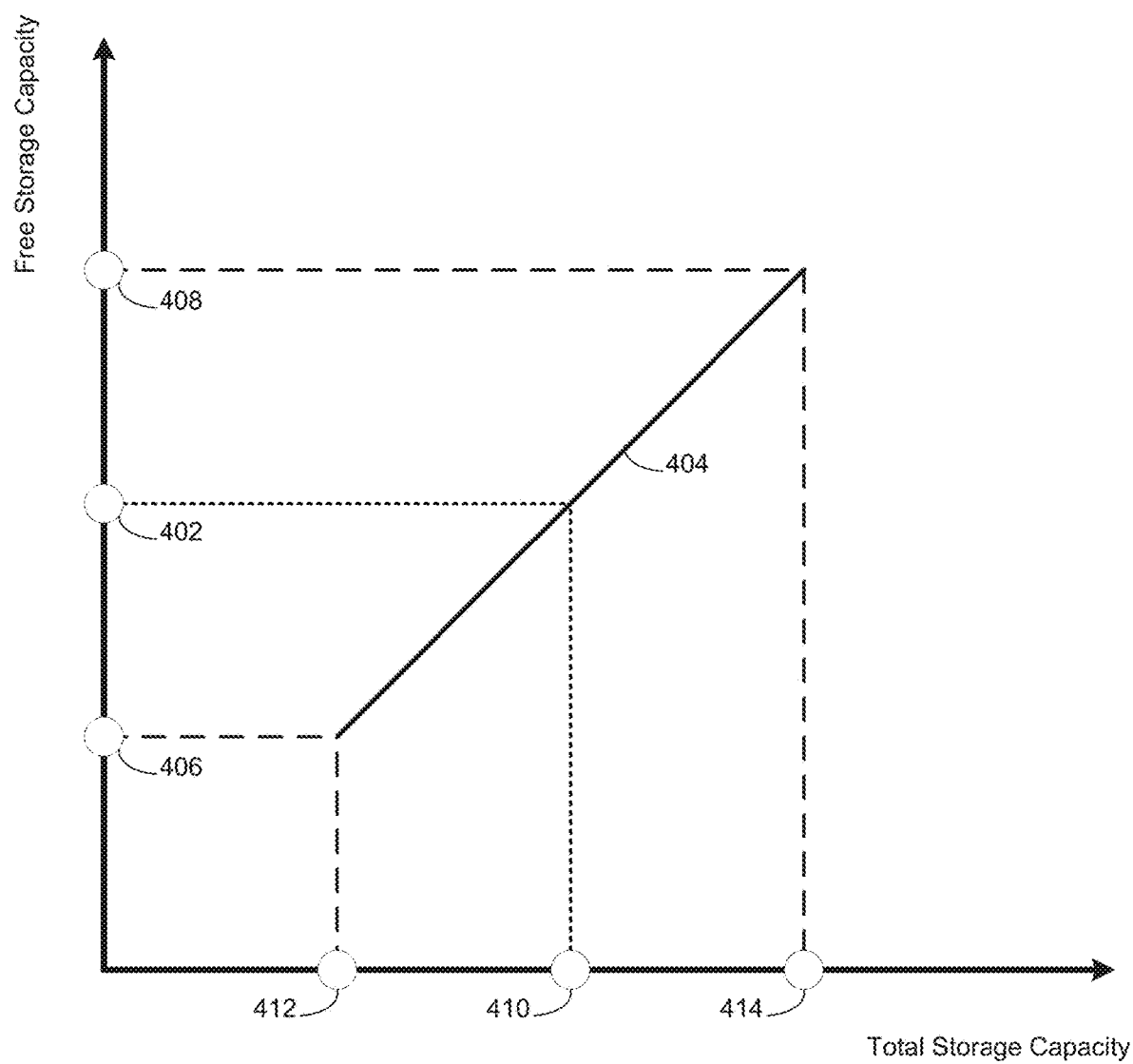
FIG. 4 is an example diagrammatic view of a linear function for determining the amount of free storage capacity for exiting the out-of-space mode according to one or more example implementations of the disclosure.
Figure 5:
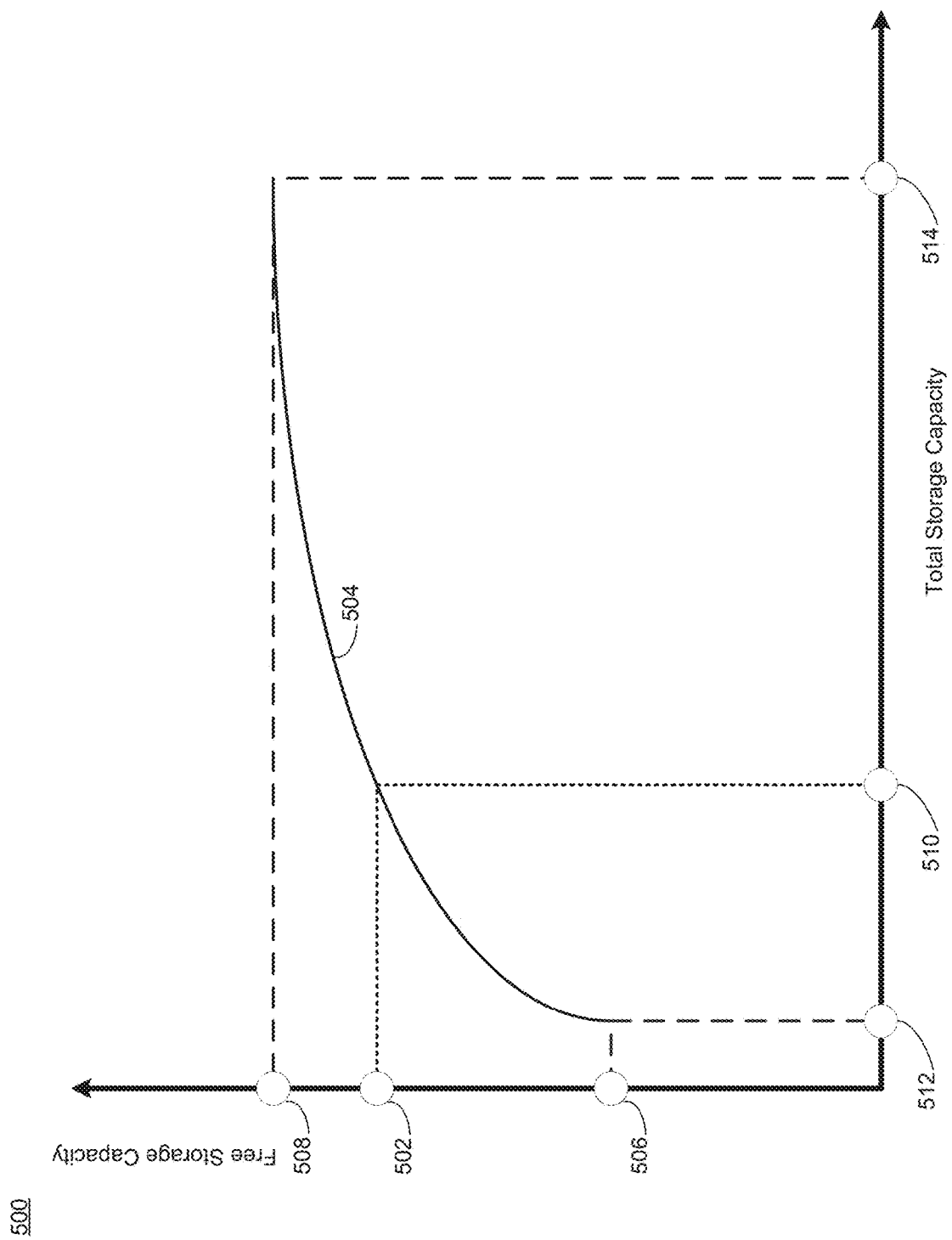
FIG. 5 is an example diagrammatic view of a logarithmic function for determining the amount of free storage capacity for exiting the out-of-space mode according to one or more example implementations of the disclosure.

The Storage Space Management Process:

Referring also to the examples of FIGS. 3-5 and in some implementations, storage space management process 10 may determine 300 whether storage space usage on a storage system has reached a predefined threshold of a total storage capacity of the storage system. An out-of-space mode may be initiated 302 on the storage system in response to determining that the storage space usage has reached the predefined threshold of the total storage capacity of the storage system. An amount of free storage capacity for exiting the out-of-space mode may be determined 304 based upon, at least in part, a predefined minimum free storage capacity, a predefined maximum free storage capacity, and the total storage capacity of the storage system.

As will be discussed in greater detail below, implementations of the present disclosure may allow for a storage system to prevent frequent disruptions in the operation of the storage system when running out of free storage space. For example, implementations of the present disclosure may preserve e.g., 5% of the physical storage space of a storage system for flushing data and/or reclaiming storage space. That is, if the storage space usage reaches e.g., 95% of the total storage capacity, the storage system may enter a read-only mode. For exiting the read-only mode, conventional approaches for storage space management may use 1% of the total storage space as a threshold. That is, if the user data free space is larger than 1%, the storage system may exit the read-only mode.

However, this conventional 1% of system storage space threshold may introduce problems in storage space management and the operation of various sized storage systems. For example, storage systems may have various total capacity configurations. In one example, a large storage system may be configured with a e.g., 1 petabyte (PB) capacity. For such a storage system with a 1 PB capacity, the system needs to release 1 PB*1%=10 terabytes (TB) physical space for the system to exit the read-only mode. In order to release 10 TB of physical storage space, it may take the storage system e.g., one hour or more to reclaim 10 TB worth of storage space. As will be discussed in greater detail below, the storage system may not service user write input/output (IO) requests during a read-only mode.

In another example, a small storage system may be configured with a e.g., 1 TB capacity. For the system with a 1 TB capacity, the storage system may need to release 1 TB*1%=10 gigabytes (GB) physical space for the storage system to exit the read-only mode. When the storage system exits the read-only mode, it can service user write IO requests. However, the storage system may fill up this 10 GB space in e.g., 10 minutes. In this example, the storage system may enter a read-only mode again. Accordingly, conventional storage space management approaches may cause large storage systems to remain in a read-only mode too long while small storage systems may too frequently enter and exit a read-only mode. In either case, conventional storage space management approaches may cause significant periods where a storage system cannot process write IO requests and the performance of the storage system may be degraded.

As will be discussed in greater detail below, implementations of storage space management process 10 may allow a storage system to be more stable in the processing of write IO requests by reducing the amount of time a large storage system is in an out-of-space mode and by reducing the number of times a smaller storage system cycles in and out of an out-of-space mode. In this manner and as will be discussed in greater detail below, storage space management process 10 may improve the storage system's ability to process write IO requests while maintaining sufficient free storage capacity to process data on the storage system and release additional storage space.

In some implementations, storage space management process 10 may determine 300 whether storage space usage on a storage system has reached a predefined threshold of a total storage capacity of the storage system. In some implementations, the storage space usage on a storage system may generally include the amount of data stored on the storage system. For example and in some implementations, determining 300 whether the storage space usage on the storage system has reached a predefined threshold of a total storage capacity of the storage system may include reading a metadata anchor page to calculate metadata usage. In some implementations, a metadata anchor page may generally include information related to metadata stored in the storage system.

In some implementations, determining 300 whether the storage space usage on the storage system has reached a predefined threshold of a total storage capacity of the storage system may include reading a virtual block anchor page to determine virtual block usage. In some implementations, the storage system (e.g., storage system 12) may provide mapping between virtual blocks or virtual large blocks (VLBs) and physical blocks or physical large blocks (PLBs). In one example, a virtual large block may describe e.g., eight megabytes (MB) of virtual address space that may be mapped to physical storage space of physical block(s). However, it will be appreciated that any sized virtual block may be used within the scope of the present disclosure. In some implementations, a virtual anchor page may generally include information related to virtual blocks of the storage system.

In some implementations, determining 300 whether the storage space usage on the storage system has reached a predefined threshold of a total storage capacity of the storage system may include reading tenant pages to calculate the user data usage. In some implementations, the tenant pages may generally include information related to user data stored in the storage system. Accordingly, determining 300 whether the storage space usage on the storage system has reached a predefined threshold of a total storage capacity of the storage system may include summing the metadata usage, the VLB usage, and/or the user data usage to determine the storage space usage of the storage system.

In some implementations, determining 300 whether the storage space usage on the storage system has reached a predefined threshold of a total storage capacity of the storage system may include comparing the storage space usage to the predefined threshold of the total storage capacity of the storage system. In some implementations, the predefined threshold of the storage capacity may define a maximum amount of storage space that may be used before storage space management process 10 determines that the storage system is "out of space." In some implementations, out of space may generally refer to the inability for the storage system to receive more data (e.g., via write IO requests). The predefined threshold of the total storage capacity may be a percentage of the total storage capacity. For example and in some implementations, the predefined threshold of the total storage capacity may be e.g., 95% of the total storage capacity of the storage system. However, it will be appreciated that any predefined threshold of the total storage capacity may be used within the scope of the present disclosure. In some implementations, the predefined threshold of the total storage capacity may be user-defined (e.g., via a user interface, hard-coded, etc.) and/or may be defined automatically by storage space management process 10 (e.g., based on average amount of storage space usage, based on total storage capacity of the storage system, etc.).

In some implementations, determining 300 whether the storage space usage on the storage system has reached the predefined threshold of the total capacity of the storage system may include determining 306 the storage space usage at one or more time intervals based upon, at least in part, a previously determined storage space usage. In some implementations, the storage space usage on the storage system may be determined 306 at a particular time interval based upon, at least in part, a most recent or previous determined storage space usage. For example, storage space management process 10 may initialize a timer following each determination 306 of the storage space usage of the storage system.

In one example, storage space management process 10 may determine 306 the storage space usage at a first time interval, where the first time interval may be a default time interval. In one example, the first time interval may be e.g., 20 seconds. In this example, storage space management process 10 may determine 306 the storage space usage e.g., every 20 seconds.

In some implementations, storage space management process 10 may determine 306 the storage space usage at a second time interval when the storage space usage is greater than or equal to a predefined threshold for determining the storage space usage at a second time interval. For example, the predefined threshold for determining the storage space usage at a second time interval may be e.g., 90% of the total storage capacity of the storage system. In this example, the second time interval may be e.g., 5 seconds. As such, storage space management process 10 may determine 306 the storage space usage e.g., every 5 seconds in response to previously determining that the storage space usage is greater than or equal to the predefined threshold for determining the storage space usage. In some implementations, storage space management process 10 may determine 306 the storage space usage at a first time interval until storage space management process 10 determines that the storage space usage is greater than or equal to the predefined threshold for determining the storage space usage at a second time interval. While examples of a number of time intervals, the duration of time intervals, and the predefined threshold for determining the storage space usage at the second time interval have been provided, it will be appreciated that any number of time intervals, any time interval duration, and any predefined threshold for determining the storage space usage may be used within the scope of the present disclosure.

In some implementations, storage space management process 10 may initiate 302 an out-of-space mode on the storage system in response to determining that the storage space usage has reached the predefined threshold of the total storage capacity of the storage system. In some implementations, when storage space management process 10 determines 300 that the storage space usage has reached the predefined threshold of the total storage capacity of the storage system, storage space management process 10 may initiate 302 or enter an out-of-space mode. In this manner, storage space management process 10 may reserve the remaining storage capacity of the storage system (e.g., storage system 12) for over-provisioning. For example, the over-provisioning space may allow a user to flush data in the storage processor (e.g., storage processor 100) to the backend (e.g., data array 112) and/or to allow other operations such as deleting volumes to reclaim storage space.

In some implementations, initiating 302 the out-of-space mode on the storage system may include processing 308 one or more read requests on the storage system (e.g., storage system 12). In some implementations, the out-of-space mode may generally include processing only read requests (e.g., read IO request 118) on the storage system (e.g., storage system 12). In this manner, the out-of-space mode be a read-only mode.

In some implementations, initiating 302 the out-of-space mode on the storage system may include rejecting 310 one or more write requests received for the storage system. In some implementations, during an out-of-space mode, storage space management process 10 may cause the storage system (e.g., storage system 12) to reject any write requests (e.g., write IO request 116) received for the storage system. In this manner, storage space management process 10 may prevent additional data from being written to the storage system (e.g., storage system 12) that may otherwise reduce the amount of free storage capacity available for flushing data to the backend (e.g., data array 112), deleting volumes to reclaim storage space, garbage collection, etc. As discussed above and in some implementations, the rejection 310 of one or more write requests while the storage system (e.g., storage system 12) is in the out-of-space mode may degrade the performance of the storage system. For example, any write requests (e.g., write IO request 116) may be queued and/or denied during the out-of-space mode which may prevent subsequent operations from being performed by the storage system (e.g., storage system 12).

In some implementations, storage space management process 10 may determine 304 an amount of free storage capacity for exiting the out-of-space mode based upon, at least in part, a predefined minimum free storage capacity, a predefined maximum free storage capacity, and the total storage capacity of the storage system. In some implementations, the amount of free storage capacity for exiting the out-of-space mode may generally indicate the amount of free storage capacity in the storage system (e.g., storage system 12) before storage space management process 10 exits the out-of-space mode. As discussed above, conventional approaches to entering and exiting a read-only mode may cause large storage systems to remain in a read-only mode too long, while small storage systems may too frequently enter and exit a read-only mode. In either case, conventional storage space management approaches may cause significant periods where a storage system cannot process write IO requests and the performance of the storage system may be degraded.

In some implementations, a predefined minimum free storage capacity may generally include the minimum amount of free storage capacity required to exit the out-of-space mode regardless of the total storage capacity of the storage system. In one example, the predefined minimum free storage capacity may be e.g., 64 GB. In some implementations, the predefined minimum free storage capacity may be tunable between a range of about 64 GB and about 128 GB. However, it will be appreciated that any range of predefined values may be used within the scope of the present disclosure. In some implementations, the predefined minimum free storage capacity may be user-defined (e.g., a user interface) and/or automatically defined by storage space management process 10. For example and in some implementations, storage space management process 10 may define or redefine the minimum free storage capacity for a particular storage system.

In some implementations, a predefined maximum free storage capacity may generally include the maximum amount of free storage capacity required to exit the out-of-space mode regardless of the total storage capacity of the storage system. In one example, the predefined maximum free storage capacity may be e.g., 128 GB. In some implementations, the predefined maximum free storage capacity may be tunable between range of about 128 GB and about 256 GB. However, it will be appreciated that any range of predefined values may be used within the scope of the present disclosure. In some implementations, the predefined maximum free storage capacity may be user-defined (e.g., a user interface) and/or automatically defined by storage space management process 10. For example and in some implementations, storage space management process 10 may define or redefine the maximum free storage capacity for a particular storage system.

In some implementations, storage space management process 10 may determine 304 the amount of free storage capacity for exiting the out-of-space mode based upon, at least in part, a predefined minimum total storage capacity and a predefined maximum total storage capacity. For example, a predefined minimum total storage capacity may generally indicate the total storage capacity for which storage space management process 10 may determine 304 that the predefined minimum free storage capacity is required for exiting the out-of-space mode. In some implementations, storage space management process 10 may determine that a storage system with the predefined minimum total storage capacity or lower may require the predefined minimum free storage capacity for exiting the out-of-space mode. Accordingly, the predefined minimum total storage capacity may not be a limitation on the size of the total storage capacity. In other words, the total storage capacity of the storage system may be less than the predefined minimum total storage capacity.

In one example, the predefined minimum total storage capacity may be e.g., 1 TB. In this example, storage space management process 10 may determine 304 that a storage system with a total storage capacity of 1 TB or below 1 TB needs the predefined maximum free storage capacity to exit the out-of-space mode. However, it will be appreciated that any value may be used for the predefined minimum total storage capacity within the scope of the present disclosure. In some implementations, the predefined minimum total storage capacity may be user-defined (e.g., a user interface) and/or automatically defined by storage space management process 10. For example and in some implementations, storage space management process 10 may define or redefine the predefined minimum total storage capacity.

In some implementations, a predefined maximum total storage capacity may generally indicate the total storage capacity for which storage space management process 10 may determine 304 that the predefined maximum free storage capacity is required for exiting the out-of-space mode. In some implementations, storage space management process 10 may determine that a storage system with the predefined maximum total storage capacity or a higher total storage capacity may require the predefined maximum free storage capacity for exiting the out-of-space mode. Accordingly, the predefined maximum total storage capacity may not be a limitation on the size of the total storage capacity of the storage system. In other words, the total storage capacity of the storage system may be greater than the predefined maximum total storage capacity.

In one example, the predefined maximum total storage capacity may be 1024 TB. In this example, storage space management process 10 may determine 304 that a storage system with a total storage capacity of 1024 TB or above 1024 TB needs the predefined maximum free storage capacity to exit the out-of-space mode. However, it will be appreciated that any predefined value may be used for the predefined maximum total storage capacity within the scope of the present disclosure. In some implementations, the predefined maximum total storage capacity may be user-defined (e.g., a user interface) and/or automatically defined by storage space management process 10. For example and in some implementations, storage space management process 10 may define or redefine the predefined maximum total storage capacity.

In some implementations, determining 304 the amount of free storage capacity for exiting the out-of-space mode may include determining 312 the amount of free storage capacity for exiting the out-of-space mode as a linear function of the predefined minimum free storage capacity, the predefined maximum free storage capacity, the total storage capacity of the storage system, a predefined minimum total storage capacity, and a predefined maximum total storage capacity. Referring also to the example of FIG. 4 and in some implementations, a graph (e.g., graph 400) of the free storage capacity as a function of the total storage capacity is shown. In some implementations, the amount of free storage capacity for exiting the out-of-space mode (e.g., amount of free storage capacity 402) may be defined as a linear function (e.g., represented as line 404) of one or more of the predefined minimum free storage capacity (e.g., predefined minimum free storage capacity 406), the predefined maximum free storage capacity (e.g., predefined maximum free storage capacity 408), the total storage capacity of the storage system (e.g., total storage capacity 410), a predefined minimum total storage capacity (e.g., predefined minimum total storage capacity 412), and a predefined maximum total storage capacity (e.g., predefined maximum total storage capacity 414).

In other words, the linear function (e.g., linear function 402) of storage space management process 10 may be used to determine 312 the free storage capacity for exiting the out-of-space mode (e.g., amount of free storage capacity 402) based upon, at least in part, the predefined minimum free storage capacity (e.g., predefined minimum free storage capacity 406), the predefined maximum free storage capacity (e.g., predefined maximum free storage capacity 408), the total storage capacity of the storage system (e.g., total storage capacity 410), a predefined minimum total storage capacity (e.g., predefined minimum total storage capacity 412), and a predefined maximum total storage capacity (e.g., predefined maximum total storage capacity 414).

In some implementations, the linear function for determining 312 the amount of free storage capacity for exiting the out-of-space mode may be defined as shown below in Equation 1:

$$c = \text{Min} + (TSC - TSC_{MIN}) \times \frac{\text{Max} - \text{Min}}{TSC_{MAX} - TSC_{MIN}} \quad (1)$$

where Min is the minimum free capacity; Max is the maximum free capacity; c is the amount of free storage space for exiting the out-of-space mode; TSC is the total storage capacity; $TSC_{MIN}$ is the predefined minimum total storage capacity; and $TSC_{MAX}$ is the predefined maximum total storage capacity.

In one example, a predefined minimum total storage capacity may be defined as e.g., 1 TB and a predefined maximum total storage capacity may be defined as e.g., 1024 TB in Equation 1 to yield Equation 2, as shown below:

$$c = \text{Min} + (TSC - 1024) \times \frac{\text{Max} - \text{Min}}{1024000 - 1024} \quad (2)$$

where Min is the minimum free capacity; Max is the maximum free capacity; c is the amount of free storage space for exiting the out-of-space mode; and TSC is the total storage capacity.

In some implementations, determining 304 the amount of free storage capacity for exiting the out-of-space mode may include determining 314 the amount of free storage capacity for exiting the out-of-space mode as a logarithmic function of the total storage capacity of the storage system based upon, at least in part, the predefined minimum free storage capacity, the predefined maximum free storage capacity, a predefined minimum total storage capacity, and a predefined maximum total storage capacity. Referring also to the example of FIG. 5 and in some implementations, a graph (e.g., graph 500) of the free storage capacity as a function of the total storage capacity is shown. In some implementations, the amount of free storage capacity for exiting the out-of-space mode (e.g., amount of free storage capacity 502) may be defined as a logarithmic function (e.g., represented as line 504) of one or more of the predefined minimum free storage capacity (e.g., predefined minimum free storage capacity 506), the predefined maximum free storage capacity (e.g., predefined maximum free storage capacity 508), the total storage capacity of the storage system (e.g., total storage capacity 510), a predefined minimum total storage capacity (e.g., predefined minimum total storage capacity 512), and a predefined maximum total storage capacity (e.g., predefined maximum total storage capacity 514).

In other words, the logarithmic function (e.g., logarithmic function 502) of storage space management process 10 may be used to determine 314 the free storage capacity for exiting the out-of-space mode (e.g., amount of free storage capacity 502) based upon, at least in part, the predefined minimum free storage capacity (e.g., predefined minimum free storage capacity 506), the predefined maximum free storage capacity (e.g., predefined maximum free storage capacity 508), the total storage capacity of the storage system (e.g., total storage capacity 510), a predefined minimum total storage capacity (e.g., predefined minimum total storage capacity 512), and a predefined maximum total storage capacity (e.g., predefined maximum total storage capacity 514).

In some implementations, the logarithmic function for determining 314 the amount of free storage capacity for exiting the out-of-space mode may be defined as shown below in Equation 3:

$$c=x*ln(TSC)+y \quad (3)$$

where TSC is the total storage capacity; x and y are adjustable variables; and c is the amount of free storage space for exiting the out-of-space mode.

In one example, a predefined minimum total storage capacity may be defined as e.g., 1 TB and a predefined maximum total storage capacity may be defined as e.g., 1024 TB, a minimum free capacity may be defined as e.g., 64 GB, and a maximum free capacity may be defined as e.g., 128 GB to solve for the adjustable variables (e.g., x=13.9 and y=−32.33), yielding Equation 4 as shown below:

$$c=13.9*ln(\text{system capacity})-32.33 \quad (4)$$

In the above example of Equation 4, storage space management process 10 may determine 314 the amount of free storage space for exiting the out-of-space mode with just the total storage capacity. While Equation 4 has been provided with an example predefined minimum free capacity and an example predefined maximum free capacity, it will be appreciated that any predefined minimum free capacity and any predefined maximum free capacity may be used within the scope of the present disclosure to determine 314 the amount of free storage capacity for exiting the out-of-space mode as a logarithmic function of the total storage capacity of the storage system.

In some implementations, storage space management process 10 may determine 316 whether the storage system has at least the amount of free storage capacity for exiting the out-of-space mode. In some implementations and as discussed above, in response to storage space management process 10 initiating 302 the out-of-space mode on the storage system, a user may delete volume to reclaim storage space in the storage system. In some implementations, the storage space usage on the storage system may be determined 306 at a particular time interval based upon, at least in part, a most recent or previous determined storage space usage. For example and as discussed above, storage space management process 10 may initialize a timer as a basis for when to determine the storage space usage of the storage system and/or following each determination 306 of the storage space usage of the storage system.

For example, storage space management process 10 may determine 316 the storage space usage at a third time interval in response to storage space management process 10 initiating 302 the out-of-space mode. In some implementations, the third time interval may be the same as either the first or second time intervals or may be different from the first and second time intervals. In some implementations, if storage space management process 10 determines that the storage system (e.g., storage system 12) does not have at least the amount of free storage capacity for exiting the out-of-space mode, storage space management process 10 may wait for a third time interval before determining whether the storage system has at least the amount of free storage capacity for exiting the out-of-space mode. In some implementations, storage space management process 10 may determine whether the storage system (e.g., storage system 12) has at least the amount of free storage capacity for exiting the out-of-space mode and that the amount of storage space usage is less than the predefined threshold of the total storage capacity before exiting the out-of-space mode.

In some implementations, storage space management process 10 may exit 318 the out-of-space mode in response to determining that the storage system has at least the amount of free storage capacity for exiting the out-of-space mode. In some implementations, in response to determining that the storage system (e.g., storage system 12) has at least the amount of free storage capacity for exiting the out-of-space mode, storage space management process 10 may exit 318 the out-of-space mode by operating as normal. In some implementations, the storage system may service write IO requests and re-allow any previously restricted operation.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
receiving, via the computing device, a predefined minimum free storage capacity, a predefined maximum free storage capacity, a predefined minimum total storage capacity, and a predefined maximum total storage capacity associated with a storage system;
determining, via the computing device, whether storage space usage on the storage system has reached a predefined threshold of a total storage capacity of the storage system;
initiating, via the computing device, an out-of-space mode on the storage system in response to determining that the storage space usage has reached the predefined threshold of the total storage capacity of the storage system;
determining, via the computing device, an amount of free storage capacity for exiting the out-of-space mode based upon, at least in part, the predefined minimum free storage capacity, the predefined maximum free storage capacity, and the total storage capacity of the storage system, wherein determining the amount of free storage capacity for exiting the out-of-space mode includes determining, via the computing device, the amount of free storage capacity for exiting the out-of-space mode based upon a ratio of the difference between the predefined minimum free storage capacity and the predefined maximum free storage capacity and the difference between the predefined minimum total storage capacity and the predefined maximum total storage capacity, wherein the amount of free storage capacity for exiting the out-of-space mode is the predefined minimum free storage capacity when the total storage capacity of the storage system is less than or equal to the predefined minimum total storage capacity and is configured to prevent the storage system from cycling in and out of the out-of-space mode, wherein the amount of free storage capacity for exiting the out-of-space mode is the predefined maximum free storage capacity when the total storage capacity of the storage system is greater than or equal to the predefined maximum total storage capacity and is configured to reduce an amount of time the storage system is in the out-of-space mode;

determining, via the computing device, that the storage system usage is below the predefined threshold of the total capacity;

determining, via the computing device, whether the storage system has at least the amount of free storage capacity for exiting the out-of-space mode;

in response to determining that the storage system has at least the amount of free storage capacity for exiting the out-of-space mode and that the storage system usage is below the predefined threshold of the total capacity, exiting, via the computing device, the out-of-space mode; and in response to determining that the storage system does not have at least the amount of free storage capacity for exiting the out-of-space mode, rejecting, via the computing device, one or more write requests received for the storage system.

2. The computer-implemented method of claim 1, wherein determining whether the storage space usage on the storage system has reached the predefined threshold of the total capacity of the storage system includes determining, via the computing device, the storage space usage at one or more time intervals based upon, at least in part, a previously determined storage space usage.

3. The computer-implemented method of claim 1, wherein initiating the out-of-space mode on the storage system includes processing, via the computing device, one or more read requests on the storage system.

4. The computer-implemented method of claim 1, wherein determining the amount of free storage capacity for exiting the out-of-space mode includes determining, via the computing device, the amount of free storage capacity for exiting the out-of-space mode as a logarithmic function of the total storage capacity of the storage system based upon, at least in part, the predefined minimum free storage capacity, the predefined maximum free storage capacity, the predefined minimum total storage capacity, and the predefined maximum total storage capacity.

5. A computer program product residing on a non-transitory computer readable medium having a plurality of instructions stored thereon which, when executed by a processor, cause the processor to perform operations comprising:

receiving, via the processor, a predefined minimum free storage capacity, a predefined maximum free storage capacity, a predefined minimum total storage capacity, and a predefined maximum total storage capacity associated with a storage system;

determining, via the processor, whether storage space usage on a storage system has reached a predefined threshold of a total storage capacity of the storage system;

initiating, via the processor, an out-of-space mode on the storage system in response to determining that the storage space usage has reached the predefined threshold of the total storage capacity of the storage system; and determining, via the processor, an amount of free storage capacity for exiting the out-of-space mode based upon, at least in part, a predefined minimum free storage capacity, a predefined maximum free storage capacity, and the total storage capacity of the storage system, wherein determining the amount of free storage capacity for exiting the out-of-space mode includes determining, via the computing device, the amount of free storage capacity for exiting the out-of-space mode based upon a ratio of the difference between the predefined minimum free storage capacity and the predefined maximum free storage capacity and the difference between a predefined minimum total storage capacity and a predefined maximum total storage capacity, wherein the amount of free storage capacity for exiting the out-of-space mode is the predefined minimum free storage capacity when the total storage capacity of the storage system is less than or equal to the predefined minimum total storage capacity and is configured to prevent the storage system from cycling in and out of the out-of-space mode, wherein the amount of free storage capacity for exiting the out-of-space mode is the predefined maximum free storage capacity when the total storage capacity of the storage system is greater than or equal to the predefined maximum total storage capacity and is configured to reduce an amount of time the storage system is in the out-of-space mode;

determining, via the computing device, that the storage system usage is below the predefined threshold of the total capacity;

determining, via the computing device, whether the storage system has at least the amount of free storage capacity for exiting the out-of-space mode;

in response to determining that the storage system has at least the amount of free storage capacity for exiting the out-of-space mode and that the storage system usage is below the predefined threshold of the total capacity, exiting, via the computing device, the out-of-space mode; and in response to determining that the storage system does not have at least the amount of free storage capacity for exiting the out-of-space mode, rejecting, via the computing device, one or more write requests received for the storage system.

6. The computer program product of claim 5, wherein determining whether the storage space usage on the storage system has reached the predefined threshold of the total capacity of the storage system includes determining, via the processor, the storage space usage at one or more time intervals based upon, at least in part, a previously determined storage space usage.

7. The computer program product of claim 5, wherein initiating the out-of-space mode on the storage system includes processing, via the processor, one or more read requests on the storage system.

8. The computer program product of claim 5, wherein determining the amount of free storage capacity for exiting the out-of-space mode includes determining, via the computing device, the amount of free storage capacity for exiting the out-of-space mode as a logarithmic function of the total storage capacity of the storage system based upon, at least in part, the predefined minimum free storage capacity, the predefined maximum free storage capacity, the predefined minimum total storage capacity, and the predefined maximum total storage capacity.

9. A computing system comprising:

a memory; and a processor configured to receive a predefined minimum free storage capacity, a predefined maximum free storage capacity, a predefined minimum total storage capacity, and a predefined maximum total storage capacity associated with a storage system, wherein the processor is further configured to determine whether storage space usage on a storage system has reached a predefined threshold of a total storage capacity of the storage system, wherein the processor is further configured to initiating an out-of-space mode on the storage system, and wherein the processor is further configured to determine an amount of free storage capacity for exiting the out-of-space mode based upon, at least in part, a predefined minimum free storage capacity, a predefined maximum free storage capacity, and the total storage capacity of the storage system, wherein determining the amount of free storage capacity for exiting the out-of-space mode includes determining, via the computing device, the amount of free storage capacity for exiting the out-of-space mode based upon a ratio of the difference between the predefined minimum free storage capacity and the predefined maximum free storage capacity and the difference between a predefined minimum total storage capacity and a predefined maximum total storage capacity, wherein the amount of free storage capacity for exiting the out-of-space mode is the predefined minimum free storage capacity when the total storage capacity of the storage system is less than or equal to the predefined minimum total storage capacity and is configured to prevent the storage system from cycling in and out of the out-of-space mode, wherein the amount of free storage capacity for exiting the out-of-space mode is the predefined maximum free storage capacity when the total storage capacity of the storage system is greater than or equal to the predefined maximum total storage capacity and is configured to reduce an amount of time the storage system is in the out-of-space mode, wherein the processor is further configured to determine that the storage system usage is below the predefined threshold of the total capacity, wherein the processor is further configured to determine whether the storage system has at least the amount of free storage capacity for exiting the out-of-space mode, wherein the processor is further configured to, in response to determining that the storage system has at least the amount of free storage capacity for exiting the out-of-space mode and that the storage system usage is below the predefined threshold of the total capacity, exit the out-of-space mode, and wherein the processor is further configured to, in response to determining that the storage system does not have at least the amount of free storage capacity for exiting the out-of-space mode, reject one or more write requests received for the storage system.

10. The computing system of claim 9, wherein determining whether the storage space usage on the storage system has reached the predefined threshold of the total capacity of the storage system includes determining, via the processor, the storage space usage at one or more time intervals based upon, at least in part, a previously determined storage space usage.

11. The computing system of claim 9, wherein initiating the out-of-space mode on the storage system includes processing, via the processor, one or more read requests on the storage system.

12. The computing system of claim 9, wherein determining the amount of free storage capacity for exiting the out-of-space mode includes determining, via the computing device, the amount of free storage capacity for exiting the out-of-space mode as a logarithmic function of the total storage capacity of the storage system based upon, at least in part, the predefined minimum free storage capacity, the predefined maximum free storage capacity, the predefined minimum total storage capacity, and the predefined maximum total storage capacity.

* * * * *